April 20, 1937.     R. H. CHURCHILL     2,078,059
HANDWHEEL COVER
Filed Sept. 16, 1935

Inventor:
Ralph H. Churchill.
by Burton & Burton
his Attorneys.

Witness
J. O. McKnight.

Patented Apr. 20, 1937

2,078,059

UNITED STATES PATENT OFFICE 2,078,059

HANDWHEEL COVER

Ralph H. Churchill, Chicago, Ill.

Application September 16, 1935, Serial No. 40,720

3 Claims. (Cl. 74—558)

This invention relates to a cover for a hand wheel such as that employed for steering an automobile, a motor boat, or as a control member in an aeroplane or other mechanism. One object of the invention is to provide a cover which shall completely encircle the wheel so as to furnish the desired character of hand grip at all points in its circumference. Another object is to provide a removable cover which can be changed at will for cleaning or for altering the decorative effect of the color which it adds to the hand wheel; another object is to afford a hand grip adapted to improve the driver's hold upon the wheel while also protecting the hands from absorbing excessive heat from the wheel in the summer, or from being chilled thereby in the winter; and, in addition, the material of the cover is such as to absorb perspiration from the hands, thus preventing the wheel itself from slipping in their grasp. The invention consists in the novel construction and arrangement of the cover as herein shown and described and as indicated by the claims.

Hand wheels that are in constant use, and particularly the steering wheels of motor vehicles, become soiled or greasy, making them disagreeable to handle. When the rim of such a wheel is made of hard, smooth material it usually absorbs heat readily from the hands of the driver, tending to chill them in cold weather, but in summer especially if exposed to the sunshine, the wheel rim tends to absorb heat, thus rendering it unpleasantly warm to the touch. In many cases the driver's hands perspire freely, often excessively, due to nervousness, so that a smooth wheel rim may thus become damp and dangerously slippery in the driver's grasp. It has been proposed, heretofore, to remedy these defects by providing some sort of fabric covering for the wheel rim, but in some instances such covers extended over only limited segments of the rim, corresponding to the portions engaged by the hands in the straight-ahead or most usual position of the wheel, and in other instances the fastening means for securing such covering material to the rim were bulky or clumsy, tending to interfere with comfortable handling of the wheel. Particularly in the case of steering wheels, it is now common practice to design steering mechanism so that the wheel turns through a full revolution, or more, in its normal range; hence, it is important to have the entire circumference of the wheel properly covered.

Figure 1:
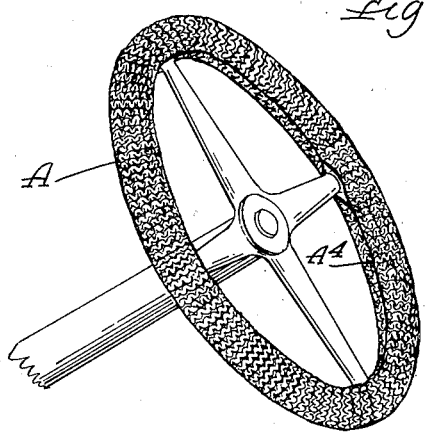
Figure 1 is a perspective view showing a hand wheel cover embodying this invention as applied to an automobile steering wheel.
Figure 2:
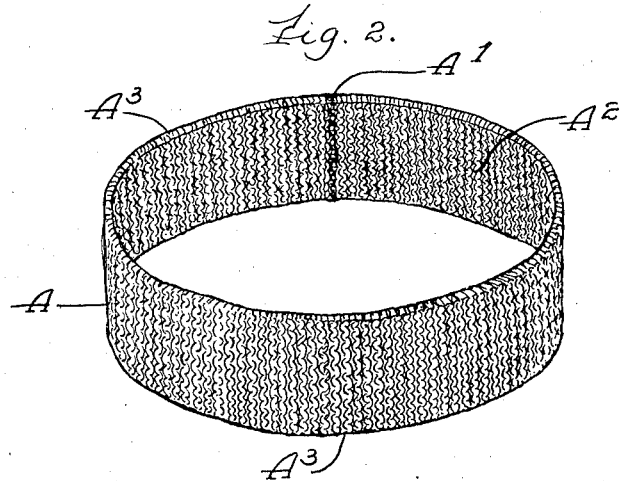
Figure 2 is a perspective view of the cover as it appears before application to the wheel.

My invention provides a cover of knitted or woven fabric which is initially formed as a straight flat strip, A, whose ends may be joined together with any suitable type of seam, as seen at $A^1$, in Figure 2, so that the strip assumes a continuous annular form. For a given hand wheel the inner circumference, $A^2$, of this annular band, A, is made somewhat less than the outer circumference of the wheel rim, so that when the band is stretched over the rim, with the middle portion of its width engaging the outermost surface of the wheel rim, this middle portion will be stretched to accommodate itself to the wheel while the marginal portions, $A^3$, of the band will tend to curl around the wheel rim toward its inner circumference. Thus, if the width of the band, A, is sufficient, its edges, $A^3$, will meet at the line indicated at $A^4$ on Figure 4. The band thus conforms automatically to the shape of the wheel rim so as to encase it snugly and completely.

To ensure that the cover, A, shall provide a safe and firm hand grip, and that it will not slip on the wheel rim I prefer to secure it by means of a suitable adhesive disposed between the inner surface of the band, A, and the outer surface of the rim of the wheel. And since it is desirable that the fabric band, A, be removable readily for cleaning or for replacement by another similar cover, I prefer to employ an adhesive which can be readily softened by a suitable solvent. For example, an adhesive composed of one of the synthetic resins, such as bakelite, may be used for this purpose, or a nitro-cellulose adhesive, soluble with acetone, may be employed. Or a commercial cement, similar to that used with rubber, would be satisfactory and could be softened and removed with naphtha. Since the knitted fabric, which is preferably of wool, is quite porous, the solvent may be applied externally, and will soak through the cover, A, rapidly attacking the adhesive and softening it so that the cover can be taken off. If naphtha is used as a solvent it will incidentally serve as a "dry cleaning" agent, tending to eliminate the dirt and grease from the cover, and at the same time removing the original cement from its inner surface. After such cleaning and a regular washing, if desired, the cover will be ready for replacement.

It will be recognized that a cover of this character can be made in a wide variety of colors, adapted to harmonize with various color schemes of finish and trim when the device is used on the steering wheel of a motor vehicle or in any similar situation where its appearance is important, and the fact that it is readily removable permits of a frequent change in the color employed, if that should seem desirable. The removability of the cover also allows it to be cleaned as often as necessary, and to be easily replaced if it should become worn or damaged. And it will be evident that a soft fabric surface, such as this cover provides for the hand wheel, will act in some measure as a shock absorber to protect the driver's hands from vibration and sudden shocks to which the vehicle is subjected, and thus will render the operation of the vehicle somewhat less tiring than when the hard-surfaced wheel rim is held in contact with the driver's hands. While there is shown and described herein certain specific structure embodying the invention, it will be manifest that various fabric materials may be used, and that some changes may be made from the specific arrangement described without departing from the spirit and scope of the invention, and that the same is not limited to the particular form herein shown and described, except in so far as indicated by the appended claims.

I claim:

1. A hand wheel cover comprising an originally flat annular band of elastic fabric transversely curved for substantially encasing the wheel rim, together with a soluble adhesive securing the inner surface of the band to the outer surface of the rim, the material of the band being sufficiently porous so that, upon external application, a solvent will penetrate through the band to the adhesive for softening it and permitting removal of the cover.

2. A hand wheel cover comprising a continuous annular member of knitted or woven fabric, together with a soluble adhesive disposed between the inner surface of the band and the outer surface of the wheel rim, and constituting the sole means for securing the cover thereto.

3. A hand wheel cover comprising an annular member of knitted woolen fabric substantially encasing the wheel rim throughout its circumference and secured thereto by means of a soluble adhesive.

RALPH H. CHURCHILL.